Figure 1:
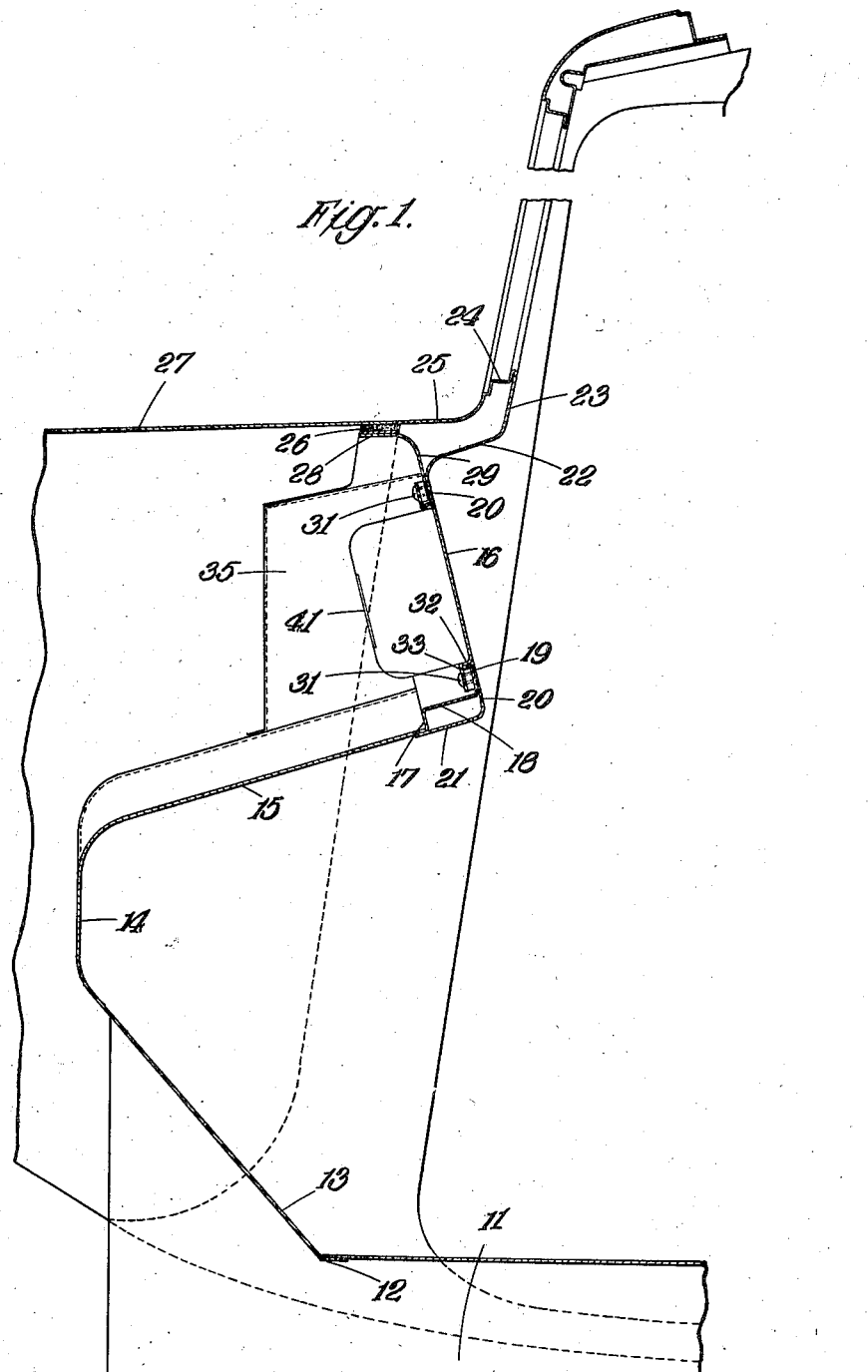

Oct. 27, 1936.          W. SWALLOW              2,058,923
              VEHICLE BODY FRONT CONSTRUCTION
                   Filed Nov. 14, 1934         2 Sheets-Sheet 2
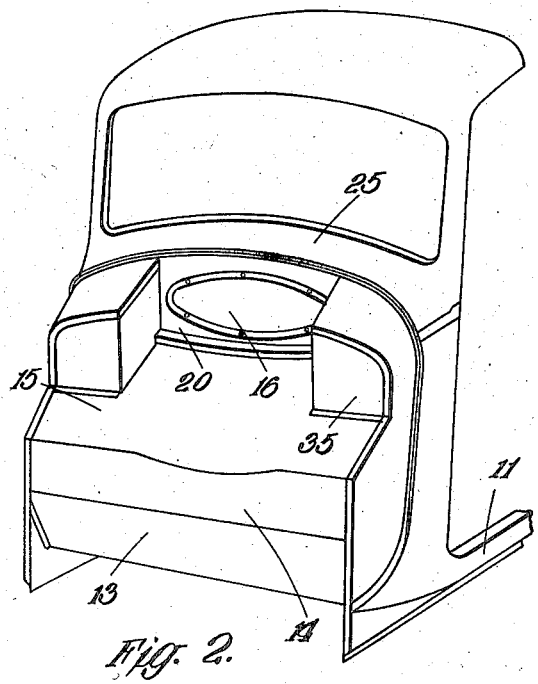
Fig. 2.
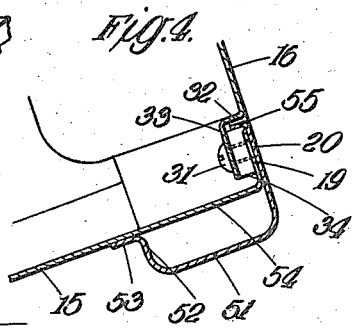
Fig. 4.
Fig. 3.
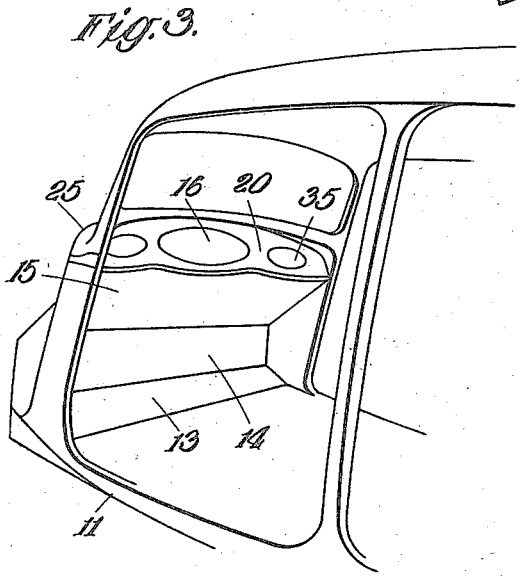
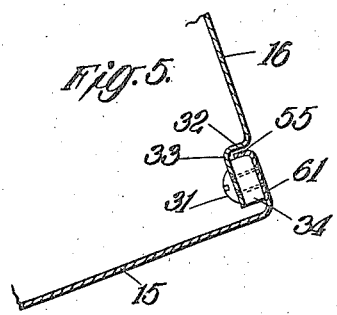
Fig. 5.
INVENTOR
WILLIAM SWALLOW
BY
ATTORNEY Patented Oct. 27, 1936

2,058,923

UNITED STATES PATENT OFFICE 2,058,923

VEHICLE BODY FRONT CONSTRUCTION

William Swallow, Headington, Oxford, England, assignor to The Pressed Steel Company of Great Britain Limited, Cowley, Oxford, England Application November 14, 1934, Serial No. 752,925
In Great Britain December 8, 1933

3 Claims. (Cl. 296—28)

One method of production of motor vehicles at the present time is to build a chassis including wheels and springs, engine, transmission gear, and battery and lighting equipment, and to fit thereon a body completely trimmed and carrying the usual window and like fixtures. In this practice it is necessary for the chassis builder or coach builder to connect the entire wiring and other instrument board connections through to an instrument board carried on the facia panel. This operation is somewhat intricate, being rendered more so by the general inaccessibility of the instrument board, and requires considerable skill to execute satisfactorily.

One object of the present invention is to facilitate the wiring and other control connections to the instrument board by enabling the whole connections to be completed prior to the mounting of the board in the facia panel, that is to say, prior to the mounting of the body on the chassis. This ensures an easier operation capable of being performed by comparatively unskilled labour and in reduced time, thereby saving production costs, which is of particular importance when vehicles are produced by mass production methods. Furthermore, by the present construction, the pockets and spaces behind the instrument panel, which normally harbour dirt and are difficult to clean, are avoided, whilst the construction ensures greater and simpler accessibility for repairs and testing, thereby encouraging a periodical maintenance inspection and consequently avoiding those troubles leading to a short life of the vehicle.

This invention is adaptable particularly to vehicles with sheet-metal bodies (although it is equally applicable to so-called composite bodies) such sheet-metal bodies comprising a front construction of inner and outer stampings, two side wall constructions and a rear or tonneau construction, all joined together by welding to present a one-piece structure. In this type of body, the front construction includes a dash panel extending from the bonnet level, forwardly of the front or A posts, to the body floor level, constituting a partition between the engine and body, the forwardly extending portion of said panel ensuring adequate leg-room for the driver of the car and providing a support for the pedals and other controls. Generally, mounted behind the dash panel (from the front of the vehicle) is a facia board carrying the instrument board, the whole of the wiring being led up through suitable apertures formed in the dash panel to said instrument board.

According to the present invention the lower portion of the dash panel is bulged forwardly to ensure adequate leg-room for the occupants of the vehicle, extended rearwardly in its upper portion and formed integrally with, or secured to, a facia panel extending upwardly to substantially the lower windscreen rail and adapted to support the instrument board.

The dash panel may be formed with its upper portion or facia panel portion to lie substantially in the plane of the windscreen and be adapted to carry the instrument board and is bulged forwardly there-beneath to provide leg-room for the driver of the vehicle and to accommodate the pedals and other controls. Normally the dash panel extends from the chassis frame level approximately to the level of the lower windscreen rail and acts as a support for the bonnet, whilst in the present construction the dash panel extends to substantially the level of the lower edge of the instrument board.

Preferably the dash panel is formed in two portions, the main portion and the facia panel portion, the lower substantially horizontal edge of the facia panel being formed with an angle or channel section flange, which may be upwardly presenting, to which the dash panel is secured in such manner as to constitute therewith a box-section transverse member.

An aperture in the facia panel portion of the dash panel receives the instrument board, preferably from the front of the vehicle, which may be wired completely and fitted with the other instrument connections and controls, prior to fitting within the facia board aperture. The instrument board may include a dash light whilst the instruments may be screened from the engine unit by a clip-on dust cover or the like formed with an aperture covered with a mica or like window to permit the dash light also to illuminate under the bonnet.

The space saved by dispensing with the upper forwardly extending portion of the dash panel may be employed for the purpose of carrying a tool chest or may be used for any other purpose where such space is desired.

The invention is illustrated in the accompanying drawings, of which Figure 1 is a vertical section through the vehicle front, Figure 2 is a perspective view of the vehicle front viewed from the front, Figure 3 is a view similar to Figure 2 but looked at from a position near the centre door post of the body, Figure 4 is a fragmentary section, illustrating a modified method of attaching the dash panel to the facia panel, and Figure 5 is a view similar to Figure 4, but showing the dash panel formed integrally with the facia panel.

The side sills 11 of the body are connected at 12 with the dash panel 15 which is extended forwardly as at 14 to provide adequate leg-room for the occupants of the vehicle, and then extended rearwardly at 15 to terminate substantially in the plane of the instrument board 16. The rear end of the portion 15 of the dash panel is flanged at 17, 18 and 19, which flanges, in conjunction with the facia panel 20, and its forwardly directed flange 21, constitute a box section transverse member extending from side to side of the body, the facia panel 20 being welded to the flange 19 and to the portion 15 of the dash panel. The facia panel 20 at its upper edge is extended rearwardly at 22 and upwardly at 23, to be clinched over, and to be secured to, the flange 24 which is a rearward extension of the shroud panel 25 formed at its forward edge with a ledge 26 acting as a support for the bonnet 27. Welded to the ledge 26 is a transverse member 28 turned downwardly at 29 for securement to the facia panel 20 and constituting with the shroud panel 25 and upper portions 22, 23 of the facia panel, a second transverse box section member. The instrument board 16 is secured to the facia panel 20 by means of the screws 31, engaging tapped blocks 34 fixed to the flanges 19 and 29 of the dash panel, the edges of the instrument board being flanged at 32 and 33 (see particularly Figure 4), the screw 31 being secured in a tapped retaining block 34 carried between the flange 33 and the flange 19 of the dash panel. Glove pockets or the like 35 may be built into or attached to the facia panel 20.

The forwardly bulged dash panel 13, 14, 15, provides further strength and stability transversely of the vehicle and at the front thereof in addition to its normal function of providing adequate leg-room.

The fittings to the instrument board 16 may be made prior to mounting the body on its chassis, the instrument board, of course, being supplied by the chassis builder. When the body is mounted on its chassis the instrument board or boards is or are slipped into the appropriate aperture or apertures in the facia panel 20 and bolted thereto, the clip-on dust cover 41 being provided to cover the instruments and connections; a dash light (not shown) mounted behind the instrument board 16 may serve the purpose also of illuminating the space immediately under the bonnet. It will be clear that the dash panel extends to a height of substantially half that between the side-sill 11 and the shroud panel 25 and provides space above the portion 15 and beneath the bonnet 27 which may be utilized for the reception of the battery, tools and so on.

Normally in the present type of all-steel bodies, difficulties arise in stiffening adequately the front portion of the body, furthermore at the front, the body does not derive much stiffness from the chassis, but with the present construction there is provided considerable strength and stability by the forwardly bulged dash panel and by the box section transverse members created by the assembly of the dash panel with the facia panel and of the facia panel with the shroud panel. The whole may be so constructed as to reduce to a minimum dust pockets, whilst the most important feature is the ease with which the instruments may be mounted and the facility with which they may be inspected periodically.

In Figure 4 is shown a modification of the method of connecting the dash panel with the facia panel; in this case the facia panel 20 is flanged forwardly at 51 and upwardly at 52, the flange 52 being turned over at 53 to engage the rearwardly extending portion 15 of the dash panel and to be secured thereto as by e. g. welding, the dash panel 15 being extended rearwardly at 54 and upturned at 19, to be welded to the facia panel 20. Around the peripheries of the apertures in the facia panel are flanged edges 55 serving to locate the tapped blocks 34 secured to the flanges 19 and 29 of the dash panel.

In Figure 5, the portion 15 of the dash panel is continued rearwardly and upturned at 61, which upturned portion 61 is further formed with the locating and stiffening flange 55, the instrument board 16, being mounted as before.

It should be understood that the instrument board 16, instead of being located centrally of the facia panel 20, may be placed to one side, or in any desired position, according to individual requirements, or alternatively, the instrument panel may be divided into a plurality of parts, assembled individually, whilst provision may be made for mounting the control panel of a radio set. Again, it should be borne in mind that the instrument panel may be mounted from the front or from the rear of the facia panel.

I claim:—

1. A vehicle body front construction comprising a cowl top panel having its rear margin arranged substantially in the plane of the windshield, an instrument board panel having its top margin secured to the rear margin of the cowl panel, said instrument panel being extended downwardly then forwardly and again downwardly, and a third panel connecting said instrument board panel at a point intermediate its top and bottom margins with the forward edge of the cowl panel and forming solely with said cowl panel and instrument board panel a box section structure extending transversely of the vehicle and acting as a transverse strengthening beam for the front end of the vehicle.

2. A vehicle body front construction comprising a cowl top panel, an instrument board panel joined along its top margin with the rear margin of the cowl top panel, a third panel joined at opposite edges directly to said first two panels along lines spaced from the top and rear margins of said first two panels to form a box section structure and a dash panel joined at its upper margin with the lower margin of the instrument panel to form a second box section structure spaced below the first mentioned structure, said box section structures forming the spaced chord members and the instrument panel the web member of a transverse strengthening beam for the front of the vehicle.

3. A vehicle body front construction comprising an instrument panel depending directly from the lower windshield header in combination with a dash panel bulged forwardly in its lower portion to insure adequate leg room for the occupants of the vehicle, and having its upper portion rearwardly extended to connect to the lower margin of the instrument panel, the joint between the rearward extension of the dash panel and the lower margin of the instrument panel being formed to provide a box section structure extended transversely of the vehicle along the bottom of the instrument panel and substantially nearer the cowl level than the floor.

WILLIAM SWALLOW.